United States Patent [19]

Baisch et al.

[11] Patent Number: 5,031,506
[45] Date of Patent: Jul. 16, 1991

[54] DEVICE FOR CONTROLLING THE POSITION OF A HYDRAULIC FEED DRIVE, SUCH AS A HYDRAULIC PRESS OR PUNCH PRESS

[75] Inventors: Roderich Baisch; Wolfgang Papiernik; Elfriede Schnoes, all of Erlangen, Fed. Rep. of Germany

[73] Assignee: Siemens Aktiengesellschaft, Berlin & Munich, Fed. Rep. of Germany

[21] Appl. No.: 248,788

[22] Filed: Sep. 23, 1988

[30] Foreign Application Priority Data

Sep. 24, 1987 [DE] Fed. Rep. of Germany ....... 3732221

[51] Int. Cl.$^5$ .............................................. G05D 3/14
[52] U.S. Cl. ................................................. 91/363 R
[58] Field of Search .................... 91/361, 363 R, 459, 91/275

[56] References Cited

U.S. PATENT DOCUMENTS

| | | | |
|---|---|---|---|
| 3,410,177 | 11/1968 | Roess et al. | 91/361 X |
| 3,487,750 | 6/1970 | Borgeson | 91/363 R X |
| 4,528,894 | 7/1985 | Crosby | 91/361 X |
| 4,712,470 | 12/1987 | Schmitz | 91/361 X |

FOREIGN PATENT DOCUMENTS

| | | | |
|---|---|---|---|
| 971648 | 7/1975 | Canada | 91/361 |
| 2653038 | 5/1977 | Fed. Rep. of Germany | 91/363 R |
| 3532931 | 4/1987 | Fed. Rep. of Germany | |
| 103102 | 8/1980 | Japan | 91/361 |
| 143802 | 11/1981 | Japan | 91/361 |
| 170901 | 10/1983 | Japan | 91/361 |

Primary Examiner—Edward K. Look
Assistant Examiner—George Kapsalas
Attorney, Agent, or Firm—Kenyon & Kenyon

[57] ABSTRACT

The position (x) of a hydraulic press or punch press is controlled highly dynamically, by a controller which uses the velocity (v) and the acceleration ($a_B$) of a piston. While the position (x) and the velocity (v) are sensed by customary measuring devices, the acceleration ($a_B$) is determined by means of a sensor (B) from the pressure (p) of the hydraulic fluid and the piston velocity (v). Thereby, an expensive acceleration measurement can be dispensed with by utilizing the already existing pressure measuring arrangement. The sensor (B) can further determine an interference quantity signal ($f_{zB}$) which can be fed to the control element (SG) for the purpose of generating a compensating interference signal.

3 Claims, 1 Drawing Sheet

DEVICE FOR CONTROLLING THE POSITION OF A HYDRAULIC FEED DRIVE, SUCH AS A HYDRAULIC PRESS OR PUNCH PRESS

BACKGROUND OF THE INVENTION a. Field of Invention

The invention relates to a device for controlling the position of a hydraulic feed drive, for a press or punch press, through a device controlling the flow of the hydraulic liquid to a cylinder/piston arrangement.

Description of the Prior Art

In commercially available hydraulic presses or punch presses, their position, i.e., the distance between the upper and the lower position is set through open loop control schemes utilizing mechanical or electronic cam control mechanisms which act on the cylinder/piston arrangement. Intervention is largely exercised manually by the operator. This results in relatively long setup and resetting times, and external disturbances such as temperature drifts are not compensated automatically.

OBJECTIVES AND SUMMARY OF THE INVENTION

It is an object of the invention to develop a device of the type mentioned above in such a manner that a highly dynamic position control in a hydraulic press or punch press is possible.

According to the invention, a device is provided, the device including a controller which generates a signal related to the difference between a reference and the actual position of the piston, as well as the velocity and acceleration of the piston. The acceleration is determined by a sensor from the pressure of the hydraulic liquid and the actual velocity.

With such a state control scheme the resonance frequency of the cylinder/piston arrangement which is connected to the tool directly or via intermediate elements, can be damped so heavily that the hydraulic unit behaves as a quasirigid system. The dynamics of the control scheme thus depends only on the speed of the control member and on the sampling time of the data processor. The fact that acceleration is not measured directly, but derived from a measurement of the pressure and the velocity in the piston, has, in principle, the advantage that a pressure measurement can be realized technically in a simple and cost-effective manner, and at the same time is usually more accurate than an acceleration measurement. Furthermore a pressure measurement is usually readily available for monitoring purposes, for instance, to a maximum-pressure monitor and for the determination of the press power.

An advantageous embodiment of the invention is characterized by the features that the interference variables affecting the relationship between the pressure of the hydraulic liquid and the velocity are simulated in the sensor to correct the control signal generated by the controller. By the addition of such interference variables, disturbances acting on the system due to friction, load behavior and such are compensated automatically without any intervention.

A simple circuit arrangement for a sensor is characterized by the provisions that the sensor comprises an integrator which receives the pressure of the hydraulic liquid as an input variable. The expected velocity is determined from the output of the integrator when no interference variables are present. The expected velocity is compared with the actual velocity, and the resulting difference is fed to a sensor control for feedback to the input of the integrator. The output signal of this sensor corresponds to the interference variables. The acceleration is determined from the sum of the pressure of the hydraulic liquid and the interference variable determined by the sensor.

BRIEF DESCRIPTION OF THE INVENTION

An exemplary embodiment of the invention is shown in the drawings and will be explained in greater detail in the following, wherein FIG. 1 shows a schematic representation of an open loop hydraulic press control arrangement, FIG. 2, a block diagram of the control apparatus in accordance with the invention, and FIG. 3, a block diagram of a section of the control apparatus of FIG. 2.

DETAILED DESCRIPTION OF THE INVENTION

Figure 1:
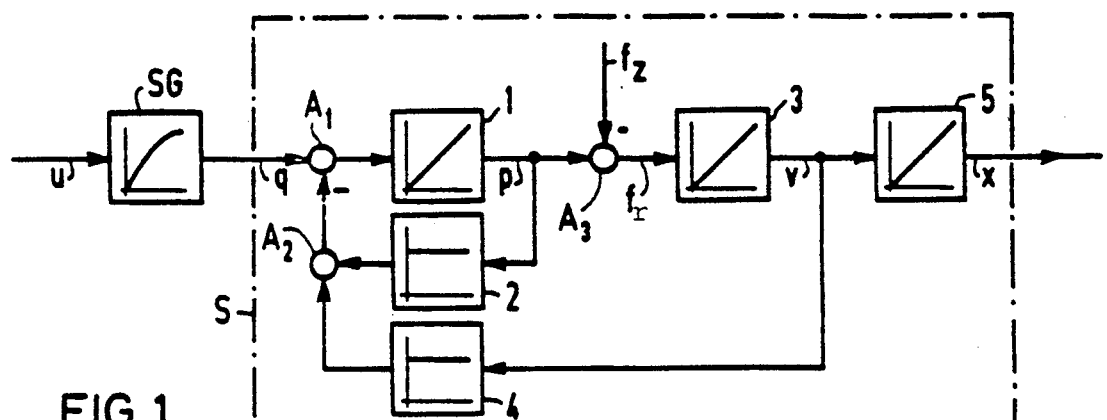

In FIG. 1, a cylinder piston s with an open loop control scheme for a cylinder of a hydraulic press is shown schematically. The cylinder receives on its input side a hydraulic fluid having a flow rate q. This flow q is controlled by a control voltage u through a control element SG.

The fluid applies a pressure in the cylinder, or stated more precisely, a differential pressure p. The pressure p is shown in FIG. 1 as an output of an integrator 1. The hydraulic fluid backflow losses at the cylinder walls are represented by the feedback proportional scaler 2. The output of the scaler is added to the flow q by adders $A_1$ and $A_2$. The pressure p in the cylinder causes a force proportional to the area of the piston which accelerates the piston. However, this force is reduced by interference forces $f_z$, such as for instance, frictional forces. The resulting force fr (generated by adder $A_3$) imparts to the piston a velocity v which is an integral function of the acceleration, as is shown in the block diagram by integrator 3.

Depending on the velocity v of the piston, the hydraulic fluid is decompressed and this effect is taken into account in the block diagram by the proportional feedback scaler 4. The output of scalers 2 and 4 are summed by adder $A_2$.

From the known motion equations the position X of the cylinder piston is an integral function of the velocity v. In FIG. 1, integrator 5 connected to the output of the integrator 3, therefore generates an output variable corresponding to the position of the piston, i.e., the position x of the press. The scaling constants and integration coefficients of elements 1 to 4 are dependent on the characteristics of each positioning cylinder and can be determined empirically, by performing relatively simple tests.

Figure 2:
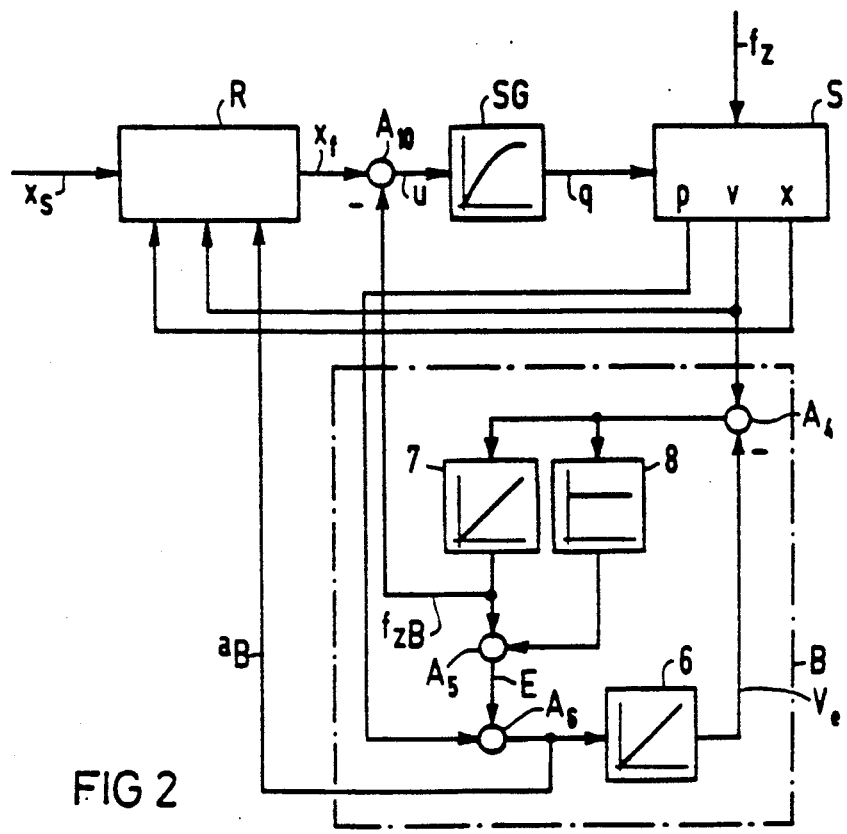

In FIG. 2, a block diagram of the device according to the invention for controlling the position of a hydraulic press is shown. The cylinder/piston S corresponds here to the system shown in FIG. 1. Likewise, the control element SG in FIG. 2 corresponds to element SG in FIG. 1. For controlling the position x, a reference $x_s$ is fed to a controller R which takes into consideration the actual position x of the piston/cylinder or of the press, as well as the corresponding velocity v, and an acceleration $a_B$ defined below. Controller R generates a highly dynamic control signal $x_f$. Signal $x_f$ is combined with signal $f_{zB}$ (defined below) by adder $A_{10}$ to generate a control input signal u for the control element SG. Element SG may be for instance, a first order differential element with a fast response. This type of element has an exponential decay output in response to step function input u(t) in the form of $h(t)=k(1-e^{-t/T})u(t)$ where $u(t)=0$ for $t<0$ and $u(t)=1$ for $t\geq 0$. (This type of response is defined in German Industrial Standard DIN 19229 dated Oct. 1975, page 11, par. 12.1.7.8.1.)

While the position x, pressure P, and velocity v can be detected by simple measuring means customary for presses, this is not directly possible for the actual acceleration. The acceleration is therefore determined by means of sensor B (shown dashed) from the pressure (or more exactly, the differential pressure) p of the hydraulic liquid as well as the measured velocity v, to generate a calculated acceleration signal $a_B$. The subscript B is used to indicate that this signal is a calculated rather than an actual signal.

In order to determine the acceleration $a_B$, the sensor B has an integrator 6, which receives as its input the pressure p of the hydraulic fluid summed with an error signal E from adder $A_6$. Initially, E is zero, and the integrator 6 determines an expected or ideal velocity Ve as its output if no interference quantities $f_z$ were present. To that extent, the integrator 6 can be considered in the broadest sense an idealized model of the system S. The theoretical velocity Ve determined by the integrator is compared with the actual or reference velocity v by adder $A_4$ and the difference is fed to a sensor control circuit which consists of an integrator 7 and a proportional scaler 8. The parallel circuit formed by elements 7 and 8 results overall in a controller behaving as a proportional integrator. (Such integrators are defined as PI elements in German Industrial Standard DIN 19226 Section 5.4, May 1968, pp. 12–13.) The output signal E is obtained by adding the outputs of elements 7 and 8 in adder $A_5$. Furthermore, a signal $f_{zB}$ is present at the output of the integrator 7 which substantially compensates for the effects of the interference signal $f_z$.

Since the sum of the interference quantity signal $f_{zB}$ and the pressure p of the hydraulic fluid is fed to the integrator 6, this input signal represents the actually effective pressure resulting in the acceleration of the piston/cylinder arrangement. Since the force consequently resulting, according to the effective area of the piston, is proportional to the resulting acceleration, the output of $A_6$ therefore corresponds to the calculated acceleration $a_B$.

Figure 3:
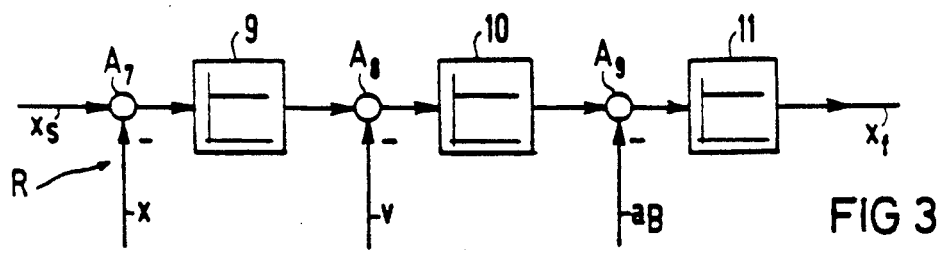

The controller R according to FIG. 2 can be realized, as is shown in FIG. 3, as a series circuit of proportional scaling elements 9, 10 and 11. The position difference is fed as the control input to the scaler 9 by adder $A_7$, the velocity difference is fed to the scaler 10 by adder $A_8$ and the acceleration difference is fed to the scaler 11 by adder $A_9$. The proportional constants of scalers 8, 9, 10, and 11 and the integrator efficients of the integrators 6 and 7 are again dependent on the characteristics of piston/cylinder system and may be determined empirically.

What is claimed is:

1. In a hydraulic drive having a cylinder/piston arrangement supplied by a hydraulic fluid, the hydraulic fluid having a pressure causing the piston to move to an actual position, at an actual velocity, the movement of the piston being affected by interference forces, a device for controlling the position of the piston comprising:

a sensor for generating an acceleration signal related to the fluid pressure and the actual velocity the sensor, including means for simulating the interference forces and for generating a simulated force signal that depends on the pressure and the actual velocity; and a comparator to generate a difference signal that corresponds to the difference between the ideal velocity and the actual velocity;

a controller for controlling the fluid, the controller generating a fluid control signal related to a preset position, the actual position, the actual velocity, and acceleration, the controller correcting the control signal with the simulated force signal.

2. A device as described in claim 1, wherein the sensor comprises:

an integrator to generate an ideal velocity signal that corresponds to the pressure;

a sensor controller for receiving the difference signal and for generating an error signal; and an adder for adding the pressure signal and the error signal.

3. A device as described in claim 2, wherein the sensor controller includes a proportional integrator.

* * * * *